June 26, 1951 J. R. COSBY 2,558,343

OSCILLATION GENERATING APPARATUS

Filed Aug. 29, 1947 2 Sheets-Sheet 1

Inventor

JAMES R. COSBY

By George V. Eltgroth

Agent

OSCILLATION GENERATING APPARATUS

Filed Aug. 29, 1947 2 Sheets-Sheet 2

Inventor
JAMES R. COSBY

By George V. Eltgroth
Agent

Patented June 26, 1951

2,558,343

UNITED STATES PATENT OFFICE 2,558,343

OSCILLATION GENERATING APPARATUS

James R. Cosby, Towson, Md., assignor to Bendix Aviation Corporation, Baltimore, Md., a corporation of Delaware Application August 29, 1947, Serial No. 771,200

5 Claims. (Cl. 250—36)

This invention relates to telemetering apparatus and, more particularly, to telemetering apparatus including a data-frequency translating unit which is relatively immune to changes in operating voltage.

Present meterological practice makes extensive use of air-borne radio-sounding devices which are released to ascend up into the stratosphere, transmitting information relative to the meterological conditions in the atmospheric strata traversed to an observing and recording station on the ground. Such devices usually include a radio frequency generator capable of being modulated, and a blocking oscillator for translating a variable resistance into changes in the frequency of modulation of the radio frequency generator. By various well-known expedients these resistances are controlled by prevailing ambient conditions, and the modulating frequency thus serves as a means of measuring those conditions at a remote indicating station having radio receiving apparatus tuned to receive the transmissions of the radio frequency generator. The severe weight restrictions which are imposed upon such apparatus and the relatively short useful life—never more than 3–4 hours—have dictated the used of batteries as a source of electric energy for the vacuum tube circuits required.

It is well known that the terminal voltage delivered by battery cells is controlled by the period during which power has been drawn, the amount of power being drawn and the temperature of the battery. In radiosonde applications, these factors reinforce one another to cause considerable change in the battery potential during a flight, for the battery voltage tends to drop after a load has been applied for some time and, in addition, the decrease in ambient temperature from +40° C. at ground level to −40° C. aloft gives rise to a further reduction.

Because of the advantage of very low power consumption, blocking oscillators are used primarily for the translation of resistance changes into frequency changes. As is well known, the frequency of such oscillators is quite responsive to changes in supply potential, and this has tended to introduce serious error into the values recorded at the measuring station.

Further as a method of frequency modulating the radio frequency generator, the anode voltage to the oscillating electric discharge device has been modulated by connecting the anode excitation terminal thereof to the electric source through a resistor also traversed by the current pulses drawn by the blocking oscillator during its active periods. While this arrangement was accepted in existing apparatus, it will be shown that some other connection for the blocking and carrier oscillators must be provided if both devices are to function most stably, reliably and efficiently.

Accordingly, it is a principal object of the invention to provide a new and novel voltage stable blocking oscillator configuration.

Yet another object of the invention is to provide new and novel radio telemetering apparatus with improved efficiency and stability of the resistance-frequency conversion characteristic.

Other objects of the invention will in part be disclosed and in part be obvious when the following specification is read in conjunction with the drawings in which.

Figure 1:
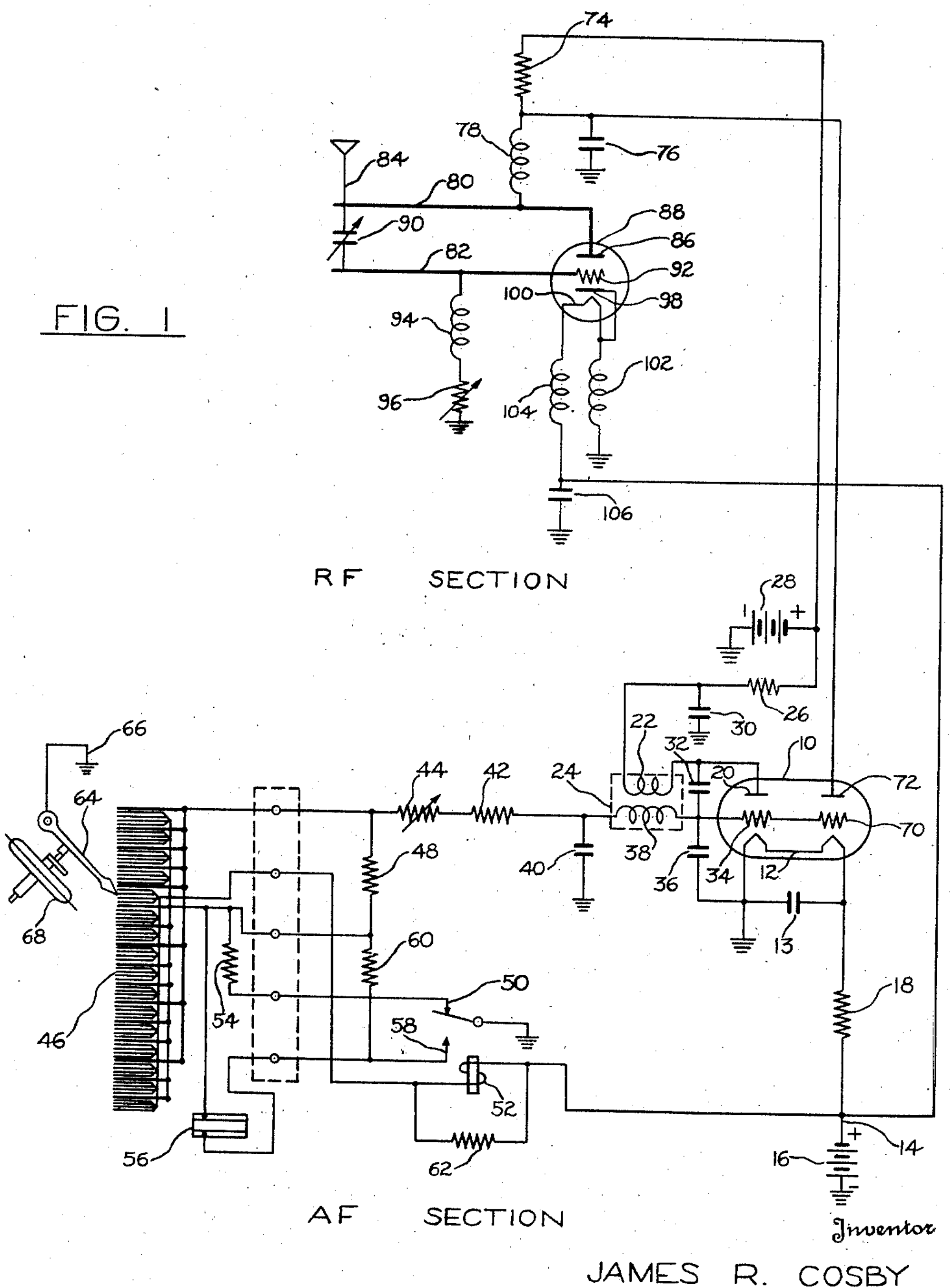
Fig. 1 is a schematic diagram illustrating radio-sounding apparatus incorporating the invention.

Referring now to Fig. 1 of the drawings, there is shown a dual triode oscillator-coupling tube 10 having one end of its filament 12 connected to the positive terminal 14 of the battery 16 through a dropping resistor 18, and the other end of the filament 12 connected with the instrument frame or ground, as it will be hereafter designated. The negative terminal of the source 16 is also connected with ground. The blocking oscillator section of the electric discharge tube 10 has an anode 20 connected through primary winding 22 of the oscillation transformer 24 and a resistor 26 with the positive terminal of anode supply source 28 also having its negative terminal grounded. The anode end of resistor 26 is connected with ground by a capacitor 30. The auxiliary oscillation frequency of the blocking oscillator is controlled by capacitor 32 connected between anode 20 and control grid 34, and capacitor 36 connected between control grid 34 and filament 12. The oscillation transformer 24 also includes a secondary 38 connected between control grid 34 and a capacitor 40. The relaxation frequency of the blocking oscillator circuits, thus far described, is controlled by the magnitude of the resistance connected in shunt with grid capacitor 40.

The condition responsive elements, whose resistance is to be translated into frequency, are inserted in this shunt circuit to provide the desired control of the modulation frequency. The various measuring elements are connected into the grid circuit through a circuit including a fixed resistor 42 in series with a variable calibrating resistor 44 which is connected with the high reference contacts in the commutator assembly 46. A resistor 48 connects the high reference contacts with the low reference contacts of commutator 46 and the low reference terminal is in turn connected with the normally closed back contact 50 of the relay 52 through a temperature responsive resistor 54. Similarly, a humidity responsive resistor 56 of the deliquescent film type is connected between the low reference terminal and a humidity terminal linked with the front contact 58 of the relay 52. The resistor 56 is shunted by a fixed resistor 60 to limit the possible range of resistance variation produced by humidity changes. Switching surges in the relay circuit are suppressed by a resistor 62 connected in parallel with the operating winding of relay 52.

A conductive pointer 64, grounded at 66, is driven over the commutator assembly 46 in response to the displacements of an aneroid element 68. Thus the various measuring elements are sequentially placed in control of the blocking oscillator relaxation or repetition frequency as the balloon-borne radiosonde ascends through the atmosphere to regions of lesser pressure. The bars shown are conductive, and the intervening spaces are non-conductive. Therefore, when the pointer arm 64 rests between the conductive bars, the temperature resistor 54 is in the grid circuit and controls the relaxation frequency and, when the intermediate bars below the 60th contact are engaged, relay 52 is energized to place the humidity responsive resistor 56 in control of the blocking oscillator. During the traverse of the every 5th commutator bar, either resistors 42, 44 and 48 together, or resistors 42 and 44 alone, control the repetition frequency of the blocking oscillator to deliver known low and high reference frequencies for the calibration of the ground apparatus.

The envelope of the tube 10 also includes a coupling triode having a control grid 70 and anode 72. The control grid 70 is galvanically connected with the control grid 34 of the blocking oscillator, and the anode 72 is connected through a relatively small resistance 74 with the positive terminal of the anode source 28. The anode end of this resistor is shunted by a radio-frequency by-pass capacitor 76 to ground and is connected through an isolating choke 78 to the anode line 80 of a line-controlled oscillator. The anode line 80 and its associated grid line 82 have an effective loaded electrical length of one-half wave length at the operating frequency. The feed choke 78 is connected substantially at a voltage node, with the antenna 84 connected at one end to a voltage anti-node and the anode 86 of the valve 88 connected at the other voltage anti-node. The grid line 82 has one voltage anti-node linked with the line 80 through a tuning capacitor 90 and the other voltage anti-node connected with the control grid 92, the central voltage node being the point of connection for an isolating choke 94 connected with ground through a variable resistor 96.

The triode oscillator valve 88 is of the indirectly heated cathode type with a cathode 98 connected to one side of the heater 100 receiving energy from the source 26 through isolating chokes 102 and 104. Radio-frequency currents in the heater circuits are minimized by a capacitor 106 shunted from the positive terminal of the heater source 16 to ground and the by-pass capacitor 13 connected in parallel with the heater 12 of the oscillator-coupling tube 10. The general details of operation of this apparatus will be immediately apparent to those skilled in the art. The oscillator tube 88, with resonant lines 80 and 82, generates high frequency electric energy radiated by antenna 84, the oscillator valve 88 receiving exciting electric energy for this purpose through the resistor 74. The blocking oscillator section of the tube 10 operates intermittently, the oscillations continuing until sufficient grid current produced bias is built up to interrupt the operations, at which time they cease until the charge on the capacitor 40 has been shunted away through the associated resistance network to reduce the bias to such a value that oscillations will again re-establish themselves when the entire process is repeated. For convenience, the period during which auxiliary oscillations are generated in the oscillation transformer 24 will be referred to as the active period, and that portion during which the circuit is quiescent awaiting the dissipation of charge on capacitor 40 will be termed passive.

During the passive portion of the blocking oscillator cycle, no current flows to the anode 72 of the coupling section of the valve 10, but during the presence of auxiliary oscillations on control grid 34 the control grid 70 is driven into the positive region to produce an anode current pulse having a length equal to the length of the active interval of the blocking oscillator operating cycle. This pulse produces a corresponding drop across resistor 74, changing the operating anode potential of the oscillator valve 88 to shift its frequency and provide the necessary modulation for the transmission of intelligence to the ground observatory.

In the ensuing discussion, it will be helpful to have an idea of the relative magnitudes of some of the critical components. With a commercial type 6N4 valve as a high frequency oscillator 88 operating at approximately 400 mcs. per sec., a value of 470 ohms has been found satisfactory for the resistor 74 shunted by a capacitor 76 of 100 mmfd. With this circuit there was employed a type 3A5 valve blocking oscillator-coupling valve 10 having an auxiliary oscillation frequency of 2 mcs. per sec. and a repetition frequency of 195 cycles per sec. with the low potential end of resistor 44 connected with ground. A 50,000-ohm unit was employed as anode resistor 26 shunted by a capacitor 30 of a .07 mfd. and the grid capacitor 40 was approximately .085 mfd. With these parameters, a voltage at source 28 of 90 volts was used, and 6.3 and 3.0 volts, respectively, applied to the filaments of the 6N4 and the 3A5. The active time of blocking oscillator operation was approximately 200 microseconds and did not vary greatly with repetition frequency or operating voltage. It will be noted that under these conditions the relaxation oscillator anode circuit time constant was 3,500 microseconds and that of the oscillator anode circuit was approximately .05 microsecond. Therefore, the anode voltage excursions of the oscillator valve 88 mirrors very accurately the 200 microsecond pulse occurring during the active period of the blocking oscillator, although the anode voltage of the blocking oscillator changed relatively sluggishly.

In the usual blocking oscillator represented by the condition for which resistor 26 has a value of zero ohms, or the capacitor 30 is of the order of a few hundred mmfd., affording by-passing action only for auxiliary frequency oscillations, a decrease in anode supply voltage results in an increase in the repetition frequency. According to the invention, it has been found that if there be used in the position of resistor 26 one having a value of at least one-third the apparent impedance of the blocking oscillator section measured with the control grid bias adjusted just below that required to cut off the oscillations, and a cooperating capacitor 30 of such value as is required to give an anode circuit time constant at least three times that of the active portion of the blocking oscillator cycle, the magnitude of the frequency shift resulting from an applied voltage change will be reduced. The use of a time constant at least five times that of the active portion of the blocking oscillator cycle gives still better results with only a slight improvement noted for further increases in the blocking oscillator anode circuit time constant. Further increase in the value of the capacitor 30 does not markedly improve the stability and, when the anode circuit time constant has increased to more than one hundred times the active portion of the blocking oscillator cycle, the stability again tends to deteriorate. Neither the anode resistance nor the time constant are particularly critical so long as they fall within the wide limits outlined. For example, in the illustration, the minimum value of anode resistor would be about 5,000 ohms while 50,000 ohms was actually employed to permit the use of a relatively small capacitor to secure the necessary anode circuit time constant, here made 17.5 times the active portion of the blocking oscillator cycle to permit wide variation in the parameters to be found in production without impairment of stability.

Figure 2:
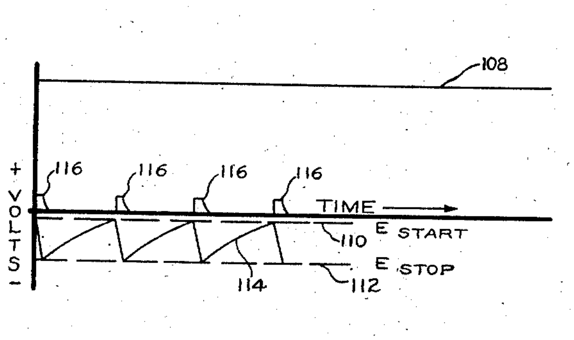
Fig. 2 is a graphic representation of voltage conditions obtaining in the conventional blocking oscillator.

It will be helpful to review the theory of blocking oscillators to understand the reasons for the existence of these limitations and the benefits accruing from the use of such circuits. The graph of Fig. 2 shows the operating conditions to be found in the usually encountered form of blocking oscillator wherein no anode resistor is present. The anode voltage is constant as indicated by the line 108, while the grid potential fluctuates periodically between the start value 110 and the stop value 112 along the curve 114. When the decreasing grid voltage, varying along the curve 114, reaches the value $E_{start}$, auxiliary oscillations are initiated producing grid current which charges the capacitor 40 until the grid voltage intercepts $E_{stop}$ indicated by dashed line 112, at which time the auxiliary oscillations are stopped and the cycle repeats itself. Corresponding to the brief active periods of the blocking oscillator, the anode current flows in a series of pulses 116. However, these pulses do not affect the operating anode potential because of the lack of impedance between the anode supply and the anode excitation terminals. In most oscillators of this class, the frequency is controlled primarily by the time duration of the passive portion of the blocking oscillator cycle, since it is much greater than the active portion. Applying Righi's equation and neglecting the active periods because they are so short, the relaxation frequency is given by the relation:

$$f=\frac{1}{RC\log_e\frac{E_{stop}}{E_{start}}}$$

Since both R and C are constants it would appear from Righi's equation that any change in frequency must be caused by a change in the ratio of $E_{stop}$ to $E_{start}$.

Figure 4:
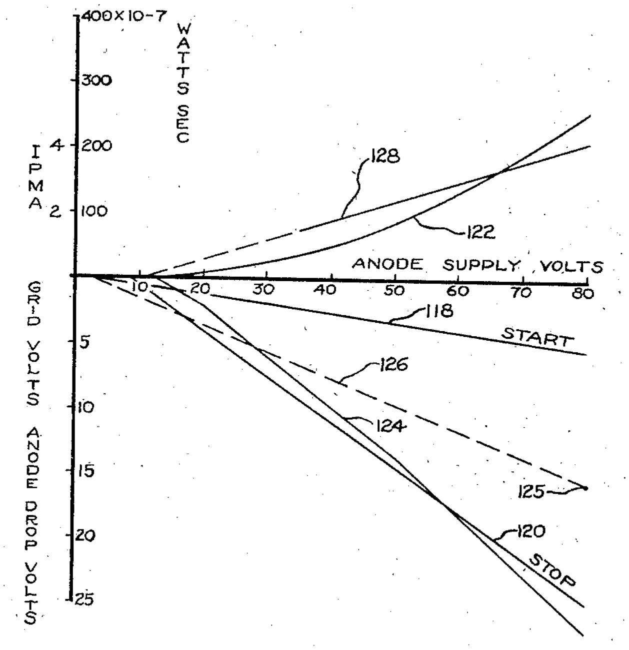
Fig. 4 is an explanatory graphic illustration of the operating conditions encountered in blocking oscillators and showing the effect of the corrective measures.

Static tests have borne out this surmise, as will be noted by reference to the curves of Fig. 4 wherein anode supply volts are represented along the abscissal axis and the grid voltages are represented by negative ordinates. These curves are illustrative of the general shape of the characteristics to be encountered but it is to be understood that their precise numeric values will vary from circuit to circuit and tube to tube. The curve 118 shows the variation in value to which the bias must be reduced to permit the initiation of oscillation at different anode voltages. This curve is a straight line intercepting the abscissal axis at a value of approximately three anode volts. The curve 118 gives the value of $E_{start}$ at any desired anode voltage.

The curve 120 shows the bias required to cut off or stop oscillations as a function of anode voltage, and is a straight line intercepting the abscissa at eight volts. The displacement of the abscissal intercepts is the item of importance to be derived from these two curves, for it is this displacement which gives rise to the voltage-frequency characteristic of the blocking oscillator. Because of the difference in intercepts, the ratio $E_{stop}/E_{start}$ diminishes steadily with decrease in anode potential becoming zero at 8 anode volts on the projected curves. Thus the spread in intercepts must inevitably give rise to a voltage-frequency coefficient. To provide perfect stability, the intercepts must be brought into coincidence, for then and only then is the ratio $E_{stop}/E_{start}$ independent of anode potential.

From a contemplation of curves 118 and 120 in Fig. 4, it will appear that the incorporation of means for diminishing the anode potential at the moment of cut-off by a varying amount with respect to the anode potential existing when oscillations start offers a possibility of moving the intercept of the $E_{stop}$ curve to the left bringing it toward the intercept of the $E_{start}$ curve. We can easily decrease the anode potential at the moment of oscillation interruption by the addition of a resistor in the anode supply circuit of the anode oscillator. This, however, has only the effect of increasing the oscillation frequency because of the diminution in ratio of $E_{stop}/E_{start}$ and does not improve the stability but, in fact, impairs the stability. The use of a shunt anode capacitor of sufficient capacity, however, imparts the desired stability. This is believed due to the fact that when the capacitor is large enough to provide a time constant more than three times the active period of the blocking oscillator, the entire blocking portion of the oscillation sequence must be energized substantially entirely from the stored energy of the capacitor. This stored energy is given by the relation $\frac{1}{2}CE_2^2-\frac{1}{2}CE_1^2$ so that the anode capacitor must swing through a variable voltage to provide the necessary grid capacitor charge. This is apparent from the curve 122 of Fig. 4 which depicts the relation between watt seconds input required to drive grid capacitor 40 to cut-off at various anode voltages. It is computed from the relation:

$$\text{Watt secs.}=\frac{C_{\text{grid}}}{2}\left(E^2_{\text{stop}}-E^2_{\text{start}}\right)$$

In the oscillator concerned, the charge transfer efficiency between anode and grid capacitors has been observed to be 20%. The curve 124 represents the swing in potential of the anode capacitor 30 required to supply the necessary energy for charging the grid circuit capacitor to the $E_{\text{stop}}$ value. It has been computed from the relation:

$$E_{\text{swing}}=E_{\text{anode}}-E^2_{\text{anode}}-\frac{2\text{ (watt sec.)}}{C_{\text{anode}}}$$

The necessary anode swing does not vary linearly with anode potential but diminishes with decreasing potential, and this gives, it has been found, the necessary correction of $E_{\text{stop}}$ to provide a constant ratio $E_{\text{stop}}/E_{\text{start}}$. This may be graphically proven by the construction of the dynamic $E_{\text{stop}}$ curve 126 which is constructed in the following manner. At abscissa 80 volts read the required swing on curve 124 which is found to be 27.25 volts. Subtract this swing from the anode supply volts giving 52.75 volts and from the static $E_{\text{stop}}$ curve 120 at 52.75 volts find the required cut-off grid bias which is 15.5 volts. Then enter this on the ordinate passing through 80 at 125 to get the first point on the dynamic $E_{\text{stop}}$ curve 126. The remainder of the points on curve 126 are similarly located by reading the anode swing from curve 124 and with this swing determining the necessary point on the dynamic $E_{\text{stop}}$ curve from the static $E_{\text{stop}}$ curve 124. Upon drawing a line through the points so obtained, the curve 126 appears having an intercept coinciding with that of $E_{\text{start}}$ curve 118. This shows that for the dynamic operating condition the ratio $E_{\text{stop}}/E_{\text{start}}$ is constant and independent of anode supply voltage. The $E_{\text{start}}$ curve 118 is unchanged in the dynamic condition because the anode voltage rises substantially to the supply value during the passive portion of the blocking oscillator operation cycle. However, even though the anode circuit time constant may be sufficiently increased that this condition is no longer strictly satisfied, yet improved operation continues to be observed until the anode capacitor value has increased to such an extent as to so diminish the anode swing that the necessary compensation cannot be secured. This begins to be noticeable when the anode circuit time constant exceeds 100 times the active portion of the blocking oscillator operating cycle.

Figure 3:
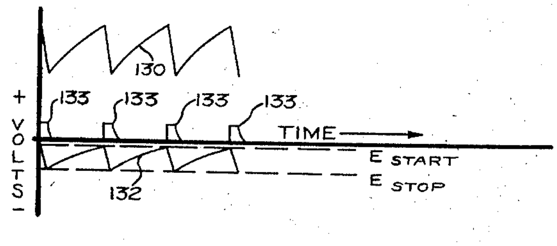
Fig. 3 is a graphic illustration of voltage conditions existing in the improved blocking oscillator circuit.

In addition to the necessity of controlling the time constant, it is further required that the resistance in the blocking oscillator anode circuit be sufficiently large to provide an appreciable voltage drop. This condition is satisfied when that resistor has a magnitude at least one-third as large as the blocking oscillator resistance read from the curve 128 of Fig. 4 which gives the relation between the anode supply voltage and the anode current flowing at the time of oscillation interruption. The oscillator potentials observed in the circuit of Fig. 1 may be seen in Fig. 3 where the curve 130 shows the anode potential across capacitor 30 plotted against time, and the curve 132 illustrates the simultaneous changes in grid potential across capacitor 40. The blocking frequency is somewhat increased, but this is readily made up for by readjustment of grid capacitor 40, and the circuit of Fig. 1 has the further advantage that the ratio $E_{\text{stop}}/E_{\text{start}}$ is substantially constant. As before, pulses 133 of anode current flow during the active portion of the blocking oscillator operating cycle.

With the tube and circuit in question the tube resistance determined from the curve 128, either using its slope or the simple $E/I$ relationship, is about 15,000 ohms which would require a minimum anode circuit resistor of 5,000 ohms. If the earlier practice were employed which made this resistor common to the radio frequency oscillator anode circuit for the purpose of injected modulating pulses, it is clear that the efficiency of the apparatus would suffer materially, for it is desired that the pulses be short, well-defined, and that there be little or no loss in the anode voltage delivered to the radio-frequency oscillator. Therefore, this earlier and simple coupling method must be abandoned. By the use of an independent coupling triode, the undesirable results of a direct link between the blocking oscillator and the radio-frequency oscillator are overcome, for a low coupling resistance 74 may be employed, materially improving the efficiency of the apparatus. This also permits the use of a very small radio-frequency by-pass 76 to allow crisp delineation of the control pulses such as is attained with a short time constant load.

The foregoing has made the essence of the invention clear and there will be apparent to those skilled in the art many modifications and applications which do not distingush substantially therefrom.

What is claimed and desired to be secured by United States Letters Patent is:

1. In combination, a source of electric energy having its negative terminal connected to ground, an electric discharge tube blocking oscillator having a cathode, a control grid, and an anode, means connecting said anode to the positive terminal of said source of electric energy, means connecting said cathode and said grid to ground, a tuned circuit for said oscillator comprising a pair of capacitors connected in series across said anode and said cathode and having a connection point therebetween connected to said control grid, feedback means for said oscillator comprising a transformer having its primary winding connected to said anode and its secondary winding connected to said cathode, a second electric discharge tube oscillator operating at a frequency higher than the repetition rate of said blocking oscillator and having a cathode, an anode, and a grid, means connecting the cathode and grid of said second oscillator to ground, a conductive impedance connected between the positive terminal of said source of electric energy and the anode of said second oscillator, a tuned circuit for said second oscillator comprising a pair of parallel resonant lines having corresponding terminals connected to the anode and grid, respectively, of said second oscillator, feed-back means for said second oscillator comprising the anode to grid capacity of said second oscillator, a coupling electric discharge device having a cathode, an anode, and a control electrode, means connecting the cathode of said coupling device to ground, means connecting the anode of said coupling device between the said conductive impedance and the anode of said second oscillator, and means galvanically connecting said coupling device control electrode with the control grid of said blocking oscillator.

2. In combination, a source of electric energy having its negative terminal connected to ground, an electric discharge tube blocking oscillator having a cathode, a control grid, and an anode, a first conductive impedance connected between said anode and the positive terminal of said source of electric energy, means connecting said cathode and said grid to ground, a tuned circuit for said oscillator comprising a pair of capacitors connected in series across said anode and said cathode and having a connection point therebetween connected to said control grid, feed-back means for said oscillator comprising a transformer having its primary winding connected to said anode and its secondary winding connected to said cathode, a second electric discharge tube oscillator operating at a frequency higher than the repetition rate of said blocking oscillator and having a cathode, an anode, and a grid, means connecting the cathode and grid of said second oscillator to ground, a second conductive impedance connected between the positive terminal of said source of electric energy and the anode of said second oscillator and having a magnitude less than said first conductive impedance, a tuned circuit for said second oscillator comprising a pair of parallel resonant lines having corresponding terminals connected to the anode and grid, respectively, of said second oscillator, feed-back means for said second oscillator comprising the anode to grid capacity of said second oscillator, a coupling electric discharge device having a cathode, an anode, and a control electrode, means connecting the cathode of said coupling device to ground, means connecting the anode of said coupling device between the said second conductive impedance and the anode of said second oscillator, and means galvanically connecting said coupling device control electrode with the control grid of said blocking oscillator.

3. In combination, a source of electric energy having its negative terminal connected to ground, an electric discharge tube blocking oscillator having a cathode, a control grid, and an anode, a first energy transfer link having a first time constant connected between said anode and the positive terminal of said source of electric energy, means connecting said cathode and said grid to ground, a tuned circuit for said oscillator comprising a pair of capacitors connected in series across said anode and said cathode and having a connection point therebetween connected to said control grid, feed-back means for said oscillator comprising a transformer having its primary winding connected to said anode and its secondary winding connected to said cathode, a second electric discharge tube oscillator operating at a frequency higher than the repetition rate of said blocking oscillator and having a cathode, an anode, and a grid, means connecting the cathode and grid of said second oscillator to ground, a second energy transfer link having a second time constant connected between the positive terminal of said source of electric energy and the anode of said second oscillator, said first and second time constants being of different orders of magnitude, a tuned circuit for said second oscillator comprising a pair of parallel resonant lines having corresponding terminals connected to the anode and grid, respectively, of said second oscillator, feed-back means for said second oscillator comprising the anode to grid capacity of said second oscillator, a coupling electric discharge device having a cathode, an anode, and a control electrode, means connecting the cathode of said coupling device to ground, means connecting the anode of said coupling device between the said second energy transfer link and the anode of said second oscillator, and means galvanically connecting said coupling device control electrode with the control grid of said blocking oscillator.

4. In combination, a source of electric energy having its negative terminal connected to ground, an electric discharge tube blocking oscillator having a cathode, a control grid, and an anode, a first energy transfer link having a first time constant connected between said anode and the positive terminal of said source of electric energy, means connecting said cathode and said grid to ground, a tuned circuit for said oscillator comprising a pair of capacitors connected in series across said anode and said cathode and having a connection point therebetween connected to said control grid, feed-back means for said oscillator comprising a transformer having its primary winding connected to said anode and its secondary winding connected to said cathode, a second electric discharge tube oscillator operating at a frequency higher than the repetition rate of said blocking oscillator and having a cathode, an anode, and a grid, means connecting the cathode and grid of said second oscillator to ground, a second energy transfer link having a second time constant connected between the positive terminal of said source of electric energy and the anode of said second oscillator, said first time constant being greater than said second time constant, a tuned circuit for said second oscillator comprising a pair of parallel resonant lines having corresponding terminals connected to the anode and grid, respectively, of said second oscillator, feed-back means for said second oscillator comprising the anode to grid capacity of said second oscillator, a coupling electric discharge device having a cathode, an anode, and a control electrode, means connecting the cathode of said coupling device to ground, means connecting the anode of said coupling device between the said second energy transfer link and the anode of said second oscillator, and means impressing oscillating energy from said blocking oscillator on said control electrode of said coupling device.

5. In combination, a source of electric energy having its negative terminal connected to ground, an electric discharge tube blocking oscillator having a cathode, a control grid and an anode, said oscillator alternating between active and passive states and being characterized by a predetermined anode-cathode resistance at oscillation cut-off, means including a resistor having a magnitude greater than one-third said anode-cathode resistance for connecting said anode to the positive terminal of said source of electric energy, a capacitor connected with said resistor and having in cooperation therewith a time constant lying between three and twenty-five times the time in seconds during which said active state persists, means connecting said cathode and said control grid to ground, a tuned circuit for said oscillator comprising a pair of capacitors connected in series across said anode and said cathode and having a connection point therebetween connected to said control grid, feed-back means for said oscillator comprising a transformer having its primary winding connected to said anode and its secondary winding connected to said cathode, a second electric discharge tube oscillator operating at a frequency higher than the repetition rate of said blocking oscillator and having a cathode, an anode, and a grid, means including a second resistor for connecting the anode of said second oscillator to the positive terminal of said source of electric energy, the time constant of said second resistor with its associated circuit capacitance being less than the time of persistance of the active state of said blocking oscillator, means connecting the cathode and grid of said second oscillator to ground, a tuned circuit for said second oscillator comprising a pair of parallel resonant lines having corresponding terminals connected to the anode and grid, respectively, of said second oscillator, feed-back means for said second oscillator comprising the anode to grid capacity of said second oscillator, a coupling electric discharge device having a cathode, an anode, and a control electrode, means connecting the cathode of said coupling device to ground, means connecting the anode of said coupling device between the said second resistor and the anode of said second oscillator, and means operatively connecting said coupling device control electrode with said control grid of said blocking oscillator.

JAMES R. COSBY.

REFERENCES CITED

The following references are of record in the file of this patent:

UNITED STATES PATENTS

| Number | Name | Date |
|---|---|---|
| 2,148,096 | Banks | Feb. 21, 1939 |
| 2,230,926 | Bingley | Feb. 4, 1941 |
| 2,233,596 | Faudell | Mar. 4, 1941 |

OTHER REFERENCES

Terman: "Radio Engineer's Handbook," McGraw-Hill, 1943, pp. 406–407, 606–608.